(12) United States Patent
Hyatt et al.

(10) Patent No.: US 9,129,026 B1
(45) Date of Patent: *Sep. 8, 2015

(54) DISPLAYING SOCIAL CONTENT IN SEARCH RESULTS

(71) Applicant: Google Inc., Mountain View, CA (US)

(72) Inventors: Andrew S. Hyatt, Forest Hills, NY (US); Sagar Kamdar, Redwood City, CA (US); Adam D. Bursey, San Jose, CA (US)

(73) Assignee: Google Inc., Mountain View, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 14/311,626

(22) Filed: Jun. 23, 2014

Related U.S. Application Data

(63) Continuation of application No. 13/483,222, filed on May 30, 2012, now Pat. No. 8,799,276.

(51) Int. Cl.
*G06F 17/30* (2006.01)
(52) U.S. Cl.
CPC ................ *G06F 17/30867* (2013.01)
(58) Field of Classification Search
CPC ............................... G06F 17/30867
USPC ............ 707/723, 999.003, 748, 752
See application file for complete search history.

(56) References Cited

U.S. PATENT DOCUMENTS

| | | |
|---|---|---|
| 2008/0005072 A1 | 1/2008 | Meek et al. |
| 2010/0306213 A1 | 12/2010 | Taylor et al. |
| 2011/0320423 A1 | 12/2011 | Gemmell et al. |
| 2012/0030228 A1* | 2/2012 | Naidu et al. .................. 707/767 |
| 2013/0054631 A1 | 2/2013 | Govani et al. |
| 2013/0097140 A1* | 4/2013 | Scheel et al. .................. 707/706 |
| 2013/0110802 A1 | 5/2013 | Shenoy et al. |
| 2013/0110827 A1 | 5/2013 | Nabar et al. |

OTHER PUBLICATIONS

Zhengqiu Yang et al., Socialrank: Social Network Influence Ranking Method, 2012, IEEE, 591-595.*

* cited by examiner

*Primary Examiner* — Jean B Fleurantin
(74) *Attorney, Agent, or Firm* — Fish & Richardson P.C.

(57) ABSTRACT

Systems for displaying social content in search results may include receiving an input query for a subject; determining that the input query is a navigational query; identifying a first page on a social network for the subject; obtaining content from the first page; obtaining search results corresponding to the input query; identifying a second page for the subject from among the search results, where the second page is represented in the search results by a snippet of content associated with the second page; combining the content from the first page with the snippet to thereby produce combined content; and outputting data corresponding to the combined content.

28 Claims, 7 Drawing Sheets

DISPLAYING SOCIAL CONTENT IN SEARCH RESULTS

CROSS-REFERENCE TO RELATED APPLICATIONS

This application is a continuation of U.S. patent application Ser. No. 13/483,222, filed May 30, 2012, the disclosure of which is expressly incorporated herein by reference in its entirety.

BACKGROUND

This disclosure relates generally to displaying social content in search results.

Social networks permit users to post information about themselves and to communicate with other people or organization, e.g., their friends, co-workers or favorite groups. Some social networks permit users to specify friendships with other users.

Search engines provide information about resources (e.g., Web pages, images, text documents, and multimedia content) that are responsive to users' queries. A search result may include, for example, a Uniform Resource Locator (URL) and a snippet of information for a resource responsive to a query. Search results may be ranked according to scores assigned to the search results by a scoring function. The scoring function generates the scores for the search results according to various signals, for example, where and how often query terms appear in the search results and how common the query terms are in the search results.

Content from a social network may be displayed in search results provided by a search engine.

SUMMARY

Described herein are examples of systems for displaying social content in search results. The systems may include receiving an input query for a subject; determining that the input query is a navigational query; identifying a first page on a social network for the subject; obtaining content from the first page; obtaining search results corresponding to the input query; identifying a second page for the subject from among the search results, where the second page is represented in the search results by a snippet of content associated with the second page; combining the content from the first page with the snippet to thereby produce combined content; and outputting data corresponding to the combined content. The example systems may include one or more of the following features, either alone or in combination.

Determining that the input query is a navigational query may include identifying a correlation between the input query and a navigational query among a set of navigational queries. Identifying the first page may include identifying a correlation between an address of the second page to a social network identifier for a user who provided the input query; and searching the social network for the first page using the social network identifier.

Obtaining content from the first page may include searching the first page using a search query to obtain the content from the first page. The search query may obtain a predefined number of posts from the first page returned in date-sorted order. A relevance score associated with content obtained by the search query may be influenced by a social connection of the content to a user who provided the input query.

At least part of a first process that includes determining that the input query is a navigational query, identifying the first page on the social network for the subject, and obtaining content from the first page may be performed in parallel with at least part of a second process that includes obtaining the search results corresponding to the input query.

Identifying the second page may include determining how the second page is ranked among the search results. The systems may include filtering the content to remove at least a portion thereof prior to combining the content from the first page with the snippet. Obtaining content from the first page may include obtaining the content based on popularity of the content.

Advantages of the foregoing techniques may include enabling a Web site owner to include content on their corresponding social network page, and thereby affect which social content to include in search results. Furthermore, by identifying the social content substantially (or, at least in part) in parallel with performing a general (e.g., Web) search, the system is able to reduce the time it takes to provide combined general and social search results.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
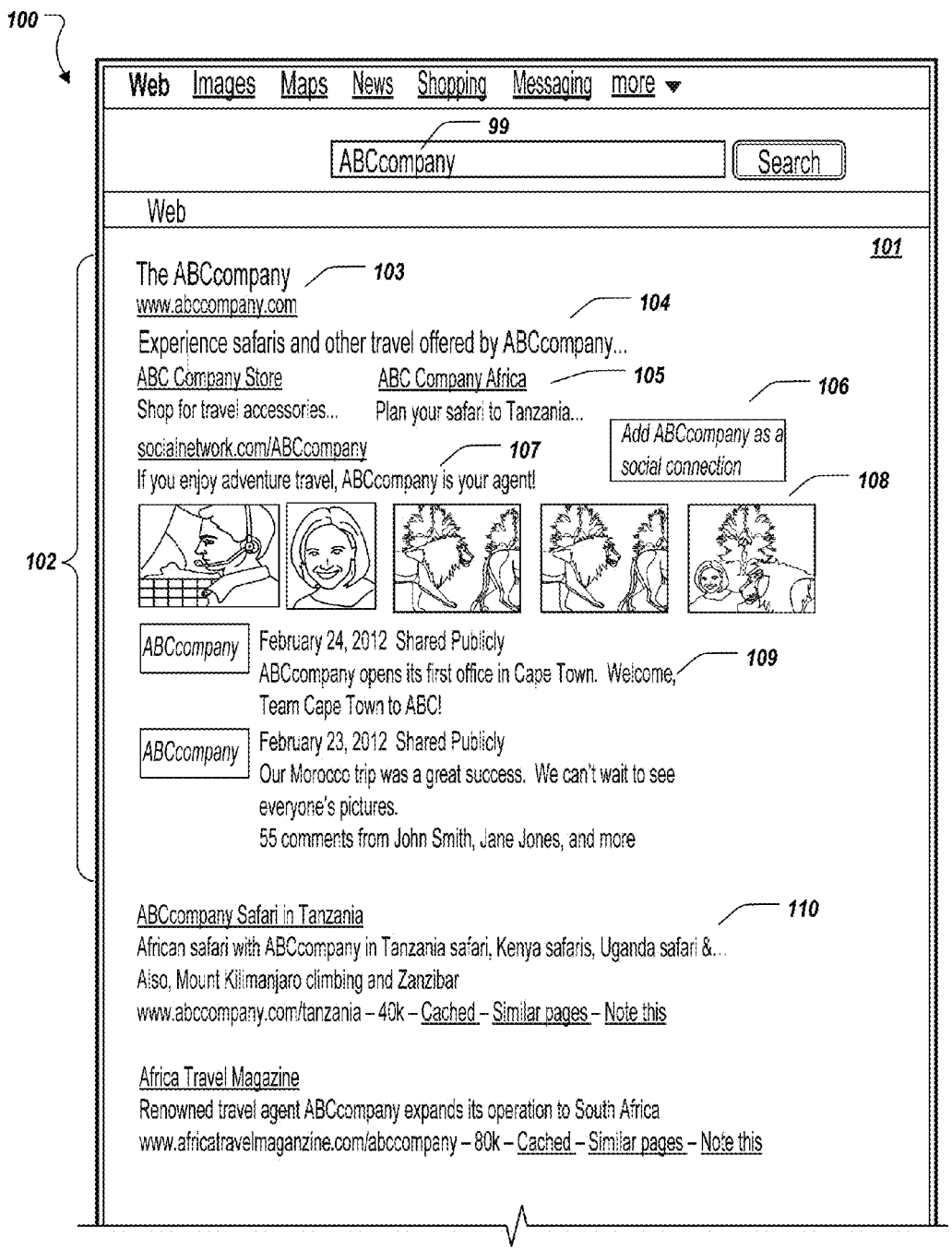
FIG. 1 is an example of a Web page that includes social network content in search results.

Described herein are systems for displaying social content in search results. In an example, a system (e.g., one or more servers) receives an input search query for a subject. The subject may be an entity that has a publicly-accessible Web page (e.g., ABCcompany.com). The system determines that the input query is a navigational query. In an example, a navigational query is a search query for locating a Web site for a subject, as opposed to locating general information about the subject. For example, a navigational query may be "ABCcompany", whereas a general query may be, e.g., "where is ABCcompany located" or "what does ABCcompany sell". In an implementation, the system identifies the input query as a navigational query using a table, or other construct, that can be used to correlate the input query to known navigational queries. The known navigational queries may be based, e.g., on input queries and search logs of the user who provided the input query and/or of other users. The known navigational queries may be associated with a uniform resource locator (URL) or other network address to which each corresponding navigational query is addressed, e.g., "ABCcompany.com".

The system identifies a page on a social network for the subject. For example, the page may be a page maintained by ABCcompany. Social network users may post and obtain content regarding ABCcompany on that page. In an implementation, the system identifies the page on the social network based on a table, or other construct, that correlates the URL or address associated with the subject obtained above to a social network user identifier (ID) associated with the subject. For example, a table or other construct (e.g., pointers, lists, and so forth) may correlate ABCcompany.com with ABCcompany's social network userID. Another table, or other construct, may be used to identify the search query subject's page on the social network. For example, such a table may correlate social network user IDs to corresponding social network pages. In the above example, the table may correlate ABCcompany's userID to the social network page for ABCcompany, e.g., socialnetwork.com/ABCcompany.

With appropriate permission, the system obtains content from the subject's social network page. For example, the system may retrieve a predefined number of the most recent posts from the social network page. In other examples, the system may retrieve the most prominent (e.g., largest) images from the social network page. In still other examples, the system may identify content on the social network page to which the user who input the query has a social connection, and select that content over other, e.g., more recent or more prominent content.

Meanwhile, e.g., in parallel with at least some of the operations described above, the system performs a general (e.g., Web) search using the input search query. In this context, "parallel" may include at least part of at least one operation from each process performed concurrently. For example, a search engine may search one or more search indexes to identify content that is relevant to the input query, rank the identified content, and output search results of ranked content. The search results may include snippets of content, e.g., textual excerpts, images, video or the like from related content. Often, although not necessarily always, the page ranked as most relevant in the search results will be the home page for the subject of the search. For example, if a user enters "ABCcompany" into the search field of a search engine, the most relevant (e.g., top ranked) search result may be the home page for ABCcompany, e.g., ABCcompany.com.

The system identifies the home Web page for the subject of the search, e.g., ABCcompany, from the search results. Typically, the home page is the most relevant page in the search results, as noted above; however, that need not always be the case. The system compares the URL of the subject's home page from the search results to the URL obtained by reference to the navigational query table. In an example, if the two match, the system incorporates content from the subject's social network page into a search result corresponding to the subject's home page. For example, the system may incorporate posts, images, video or the like from the subject's social network page into a search result associated with the subject's home page. So, in the example above, content from ABCcompany's social network page, e.g., socialnetwork.com/ABCcompany is incorporated into a search result for the home page ABCcompany.com. The search results are output and displayed on a device of a user who input the search query.

For example, FIG. 1 shows a search results Web page 100 for search results obtained from a search using keyword 99, namely "ABCcompany". In FIG. 1, search results 101 include an entry 102 that combines general Web content for a subject (here, ABCcompany) and content from that company's social network page (here, socialnetwork.com/ABCcompany). The general Web content 103 includes a snippet 104 of content from ABCcompany's Web page, along with links 105 provided on that Web page. The content 106 from ABCcompany's social network page includes, e.g., a tag line 107 for the company (e.g., the company's slogan), images 108 posted to the company's social network page, and two of the most recent posts 109 made by ABCcompany to its social network page. The content shown here is an example only, and different content, or amounts, may be shown. As shown, Web page 100 also includes search results 110 that do not include social content and that may be directed to links that are not ABCcompany's home page.

The techniques described above may be implemented in an appropriate network environment, with appropriate devices and computing equipment. An example of such an environment is described below.

Figure 2:
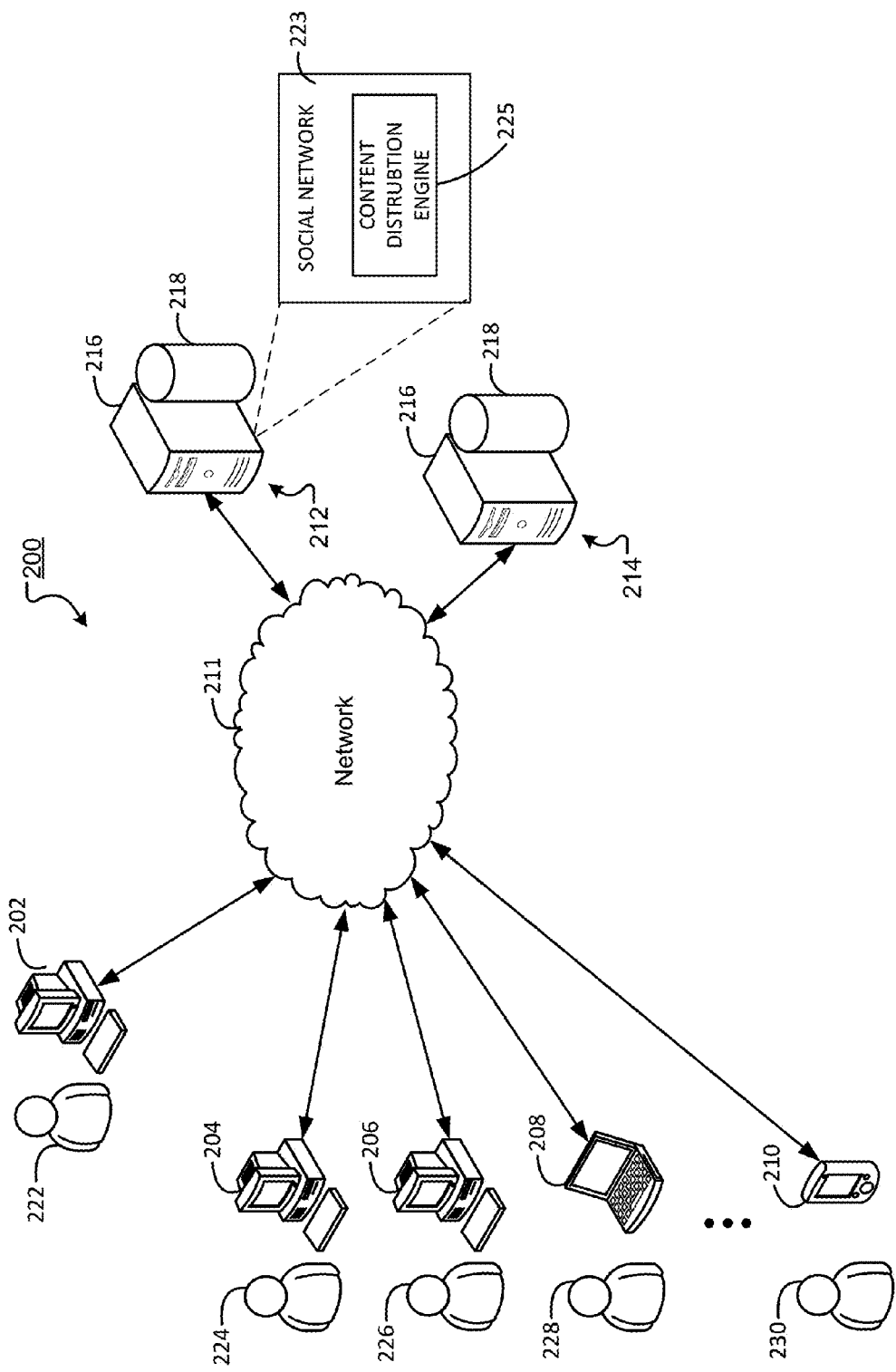
FIG. 2 is a block diagram showing an example of network environment on which the processes described herein may be implemented.

FIG. 2 is a block diagram showing an example of a network environment 200 on which the techniques described herein may be implemented. Network environment 200 includes computing devices 202, 204, 206, 208, 210 that are configured to communicate with a first server system 212 and/or a second server system 214 over a network 211. Computing devices 202, 204, 206, 208, 210 have respective users 222, 224, 226, 228, 230 associated therewith. The first and second server systems 212, 214 each includes a computing device 216 and a machine-readable repository, or database 218. Example environment 200 may include many thousands of Web sites, computing devices and servers, which are not shown.

Network 211 may include a large computer network, examples of which include a local area network (LAN), wide area network (WAN), the Internet, a cellular network, or a combination thereof connecting a number of mobile computing devices, fixed computing devices, and server systems. The network(s) included in network 211 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 202, 204, 206, 208, 210 enable respective users 222, 224, 226, 228, 230 to access and to view documents, e.g., Web pages included in Web sites. For example, user 222 of computing device 202 may view a Web page using a Web browser. The Web page may be provided to computing device 202 by server system 212, server system 214 or another server system (not shown).

In example environment 200, computing devices 202, 204, 206 are illustrated as desktop-type computing devices, computing device 208 is illustrated as a laptop-type computing device, and computing device 210 is illustrated as a mobile computing device. It is noted, however, that computing devices 202, 204, 206, 208, 210 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 202, 204, 206, 208, 210 can participate in a social network 223 hosted, e.g., by the server system 212, by uploading and downloading electronic content to the social network. The electronic content may include, e.g., text comments (e.g., updates, announcements, replies), digital images, videos, audio files, and/or other appropriate information. In some implementations, information can be posted on a user's behalf by systems and/or services external to social network 223 or to server system 212. For example, the user may post a review of a movie to a movie review Web site, and with proper permissions, that Web site may cross-post that review to social network 223 on the user's behalf. The user may include, with a post, a tag, which includes a hyperlink to a discussion forum about a particular topic (e.g., the movie). The tag typically relates to the topic of the post (although that need not be the case always).

Generally, users interacting with computing devices 202, 204, 206, 208, 210 can also use social network 223 to define social circles to organize and to categorize the user's relationships to other users of the social network. The social circles become part of the user's social connections. Electronic content can be distributed to contacts within social network 223, including one or more social circles, so that such content is viewable by the indicated contacts and/or contacts, or others. In an example operation, a user of social network 223 can generate content and indicate, e.g., one or more individual social network contacts and/or social circles to which the generated content is to be distributed. During a content write-time, a content data set is transmitted from the user's client computing device (e.g., computing device 202 of FIG. 2) to a distribution hub (e.g., a content distribution engine 225), which can be provided at a server (e.g., server system 212 of FIG. 2 or elsewhere on the network). In some implementations, the content data set may include content data (e.g., text, identity of the content author, tag, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, other data can be appended to content data sets. Example other data can include scoring data. In some examples, scoring data can include a social affinity score among other possible scoring data. As described in more detail below, affinity identifies the closeness of parties on a social graph.

The scoring data may be recipient specific. For example, the scoring data can include social affinity data that is provided based on respective social affinity scores between an author of the content and each recipient of the content. For example, a first user can author content and define a distribution of the content, thereby creating an underlying content data set. The distribution can include a second user and a third user, and so forth. A first social affinity score associated with a social relationship between the first user and the second user can be provided, and a second social affinity score associated with a social relationship between the first user and the third user can be provided. The first social affinity score can be different from the second social affinity score, reflecting different social relationships between the first user and the second user and the first user and the third use. The first social affinity score and the second social affinity score can be appended to the content data set and/or stored in another location while maintaining an association with the content data set.

In some implementations, the distribution data is processed to provide an access control list (ACL) that specifies which contacts within the social network are granted access to the content. In some implementations, content-associated social affinity scores can be processed to provide the ACL. For example, distribution data can indicate that content is to be accessible by, and/or distributed to, a particular user. A social affinity score can be determined for the content and can be specific to a relationship between the content recipient and the author of the content. In some examples, if the social affinity score is below a threshold score, it is determined that the content will not be accessible by, and/or distributed to, the particular user. Consequently, in this example, although the particular user had been explicitly targeted for distribution of the content by the author, the particular user is not provided in the ACL for the content. In some examples, if the social affinity score is at or above the threshold score, it is determined that the content will be accessible by, and/or distributed to, the particular user. Consequently, the particular user has been explicitly targeted for distribution of the content by the author and the particular user is provided in the ACL for the content.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 218 of FIG. 2) and are transmitted to a client device associated with the requesting user. In some implementations, the ACL can be provided based on an overall score, a quality score and/or the social affinity score. Content may be distributed to a user's main page for inclusion in a content stream.

Figure 3:
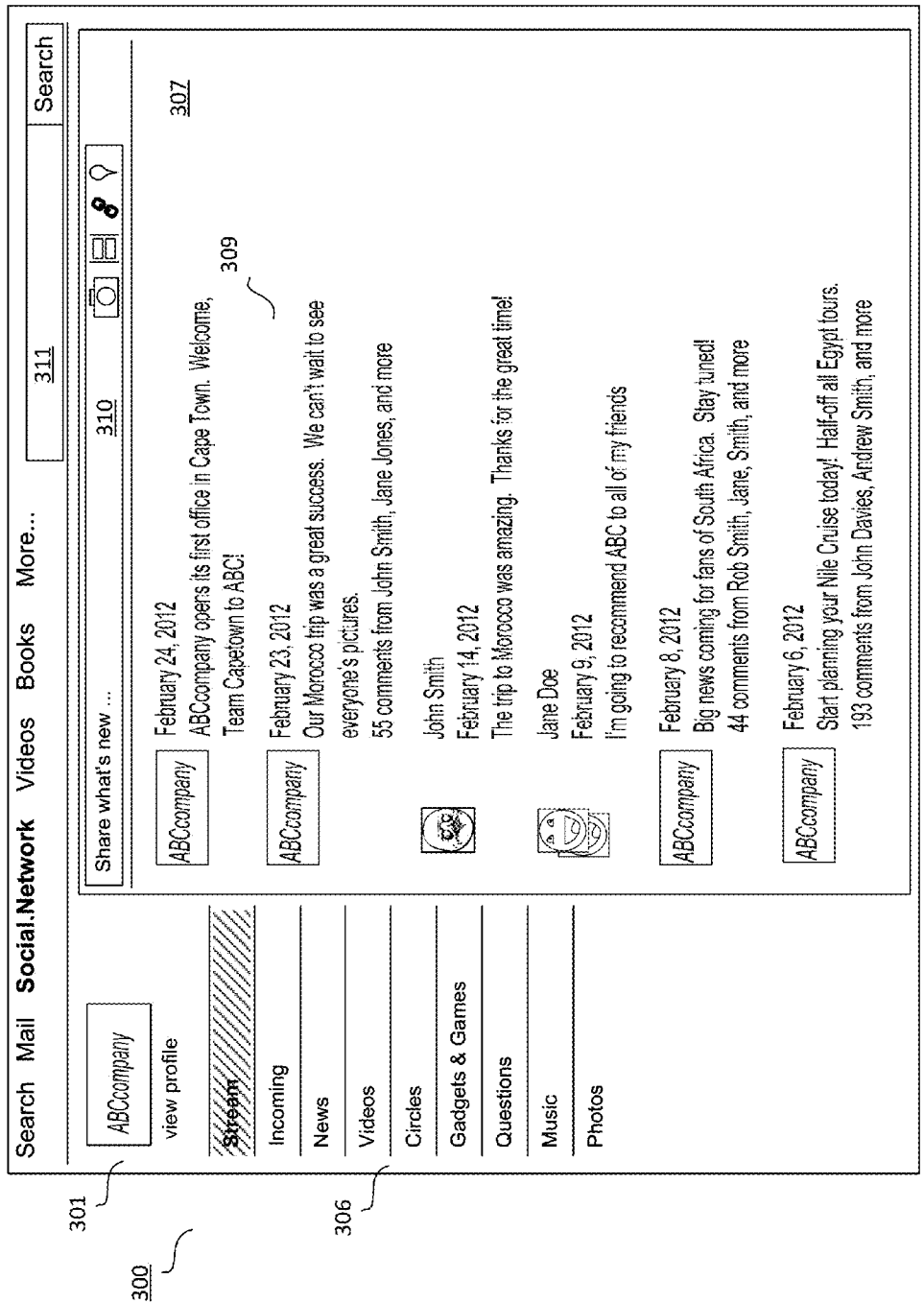
FIG. 3 shows an example main page for a member of a social network.

FIG. 3 shows an example main page 300 for a member of a social network. For example, page 300 can be provided as a Web page within a Web site of social network 223, and can display electronic content that has been shared by/with a member 301 associated with the page 300. In the illustrated example, the member is "ABCcompany" and page 300 displays, items (e.g., electronic content) that ABCcompany has posted, that other members have shared with ABCcompany, and/or items that the member has shared with other members. Page 301 includes a social network menu 306 and a content stream 307, in which items of content are presented. Example content items 309 that have been distributed by/to the member are displayed in the content stream. Items 309 displayed in content stream 307 may include, e.g., electronic content that is distributed to the member from contacts established within the social network. A content sharing interface 310 can also be provided on page 300. The member can activate (e.g., click on) the interface 310 to input electronic content. Although six content items are depicted in FIG. 3, it is appreciated that page 300 can display more or less than six content items to the member. A search field 311 can also be provided on page 300 to search social network 223 for content.

Figure 4:
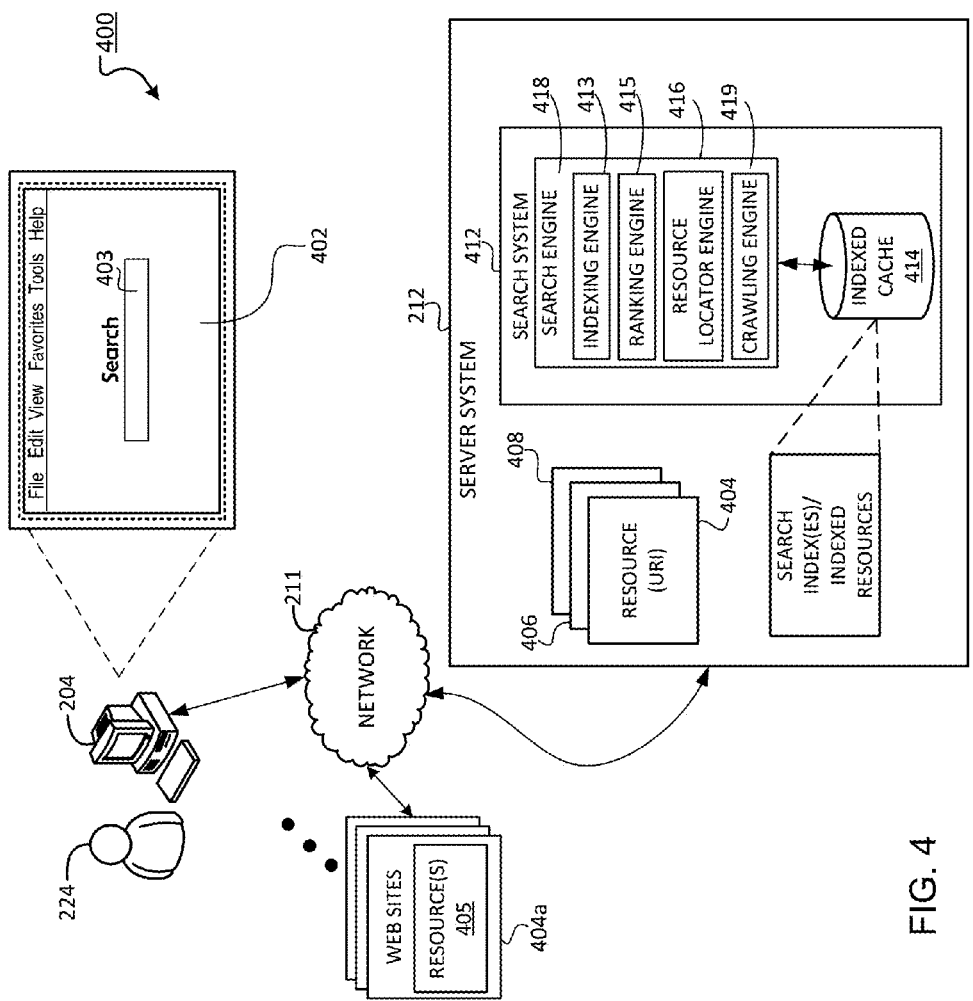
FIG. 4 is a block diagram of an example of part of the network environment of FIG. 2.

FIG. 4 is a block diagram of an example part of the network environment of FIG. 2. Specifically, FIG. 4 shows portion 400 of example network environment 200. In this example implementation, server system 212 stores resources 404, 406, 408. A resource has an associated resource identifier (Resource ID). For example, resources 404, 406, 408 may correspond to different Web pages of the same Web site, or may correspond to Web pages of different Web sites. As explained below, in this example operation, computing device 204 communicates with server system 212 to display a home Web page ("home page") 402 of a search engine Web site and a home page of a social network (e.g., page 300 of FIG. 3 containing the user's content stream).

To view a Web page, user 224 may input or select a Resource ID using a Web browser that is executed on computing device 204. The Resource ID may include, for example, a URI or a uniform resource locator (URL). A request including the Resource ID is transmitted from computing device 204 to server system 212 over network 211. In response, the server system identifies the requested resource based on the Resource ID, and transmits the requested resource to computing device 204 over network 211. For example, the resource may be home page 300 of social network 223 or a home page 402 of search system 412. In some implementations, search system 412 is part of social network 223 or it is independent thereof yet able to access content from social network 223.

Page 402 for search system 412 may include a field 403 for inputting a search query that is transmitted to the search system. The search query may include, e.g., one or more terms, images, audio, video, or other content. In response, the search system performs a search of an indexed cache containing one or more search indexes, and returns a search results list to a user. The search results list may include, e.g., links to content that is deemed relevant to the search terms. Search system 412 may be implemented, e.g., on server system 212 as shown or on other appropriate hardware. Search system 412 includes a search engine 418 and one or more search indexes. Search system 412 identifies resources 405 (e.g., Web pages, images, news articles, user-generated content, social information (e.g., from social network 223), or other public and/or private resources) provided by content publishers on Web sites 404a. Appropriate permission(s) may be required to access non-public content.

Search system 412 includes a crawling engine 419 to crawl resources, and an indexing engine 413 to index those resources in one or more search indexes (referred to collectively as "search index") stored, e.g., in indexed cache 414. Search engine 418 also includes a resource locator engine 416 for identifying resources within the search index that are responsive to, and that may be relevant to, a search query (for example, by implementing a query text matching routine). A ranking engine 415 ranks resources deemed relevant to the search query and outputs data for the resulting ranked results to a user device.

Social graph information may be included in a same search index as other resources or in a separate search index (not shown). As described in more detail below, the social graph information may include, e.g., comments, endorsements, connections, affinities, and so forth related to indexed content and to a user's social graph. The social graph information may include content from social network 223. A separate search may be performed for general search results responsive to a query, as well as particular search results, that identify resources associated with the user's social graph (e.g., endorsed Web content).

In some implementations, information associated with the user's social graph may be indexed by generating and incorporating suitable data structures, e.g., social restricts, into an existing search index. In some examples, the indexing engine may generate social restricts by mapping identified information to corresponding Web resources referenced in a search index and determining the social connection between the Web resources and the user. For example, the system may access a relationship lookup table that includes relationship data describing a user's social graph to determine such social connections. In some examples, social restricts may be provided in the form of an information tag or other data associated with a referenced Web resource included in the search index.

User-generated content (e.g., social network content) may be included in a same index as other resources or in a separate index, as noted above. In this regard, with appropriate permission, crawling engine 419 may crawl user-generated content (of both the searcher and others, e.g., members of the searcher's social graph), and indexing engine 413 may incorporate that content into an appropriate search index. Resource locator engine 416 may identify that user-generated content based, e.g., on a relevance score of the user-generated content to a search query and based, e.g., on other information, including, e.g., the social connection of the searcher to the content itself or to an author of the content. In this regard, the existence or non-existence of a social connection to the content or author may affect the relevance score. In this context, an author is not limited to one who created the content, but may include, e.g., anyone who interacted with the content, shared the content, endorsed the content, posted the content, and so forth.

In some implementations, social network content may be obtained by receiving data "pushed" from a server, rather than through crawling.

In response to a search query, search engine 418 may access indexed cache 414 to identify resources 405 that are relevant to the search query. Resource locator engine 416 may identify resources 405 in the form of search results and return the search results to a requesting device in search results pages. A search result may include data generated by search system 412 that identifies a resource 405, and that includes a link to the corresponding resource, along with images, video, or other appropriate content. An example search result may include a Web page title, a snippet of text or a portion of an image extracted from the Web page, and the URL of the Web page. In some cases, the search results may also include social information. For example, included with some of the search results may be comments, endorsements, or other information obtained about the search results from a user's social graph. The search results may also include user-generated content displayed alone or in association with relevant social information (e.g., a link to a content author's profile). Search results may be displayed in a user's content stream along with other content. For example, a user may conduct a search of the social network from their main page, and the results may be displayed in their content stream along with others' posts.

As noted above, a social graph is a way to represent, graphically, social connections between two parties that may, or may not, be on the same social network, and to represent connections between parties and content. A party may be an individual or an entity, e.g., a company, organization, country, or the like. Types of connections in social graphs may include, but are not limited to, other users to which a user is in direct contact (e.g., user messaging or chat contact, direct contacts on social sites) and users to which the user is in indirect contact (e.g., contacts of contacts, connections of users that have a direct connection to the user). In some examples, a direct connection may be unilateral or bilateral. In some implementations, a social graph includes content generated by individuals (e.g., blog posts, reviews) as connections to the user. The social graph may include connections within a single network or across multiple networks.

Distinct social graphs may be generated for different types of connections. For example, a user may be connected with chat contacts in one social graph, electronic message contacts in a second social graph, and connections from a particular social network in a third social graph. A social graph may include edges to additional parties at greater degrees of separation from the user. For example, an electronic message contact may have its own electronic message contacts to others adding a degree of separation from the user (e.g., user→electronic message contact→contact of electronic message contact). These contacts may, in turn, may have additional contacts at another degree of separation from the user. Similarly, a party's connection to someone in a particular social network may be used to identify additional connections based on that person's connections. Distinct social graphs may include edges connecting one or more social graph to one or more other social graphs. Thus, a social graph may include a single social graph or multiple interconnected social graphs.

As noted, users may designate content as endorsed, share or comment on content, quote URLs, or otherwise indicate an interest or liking of content, examples of which include, but are not limited to, a particular resource, Web page, or search result. For example, an application, widget, or scripting may be provided in search results pages, Web pages, or within a browser application that allows a user to indicate liking, sharing, or other evaluation of an associated resource or search result. The user may mark the particular resource, Web site, or search results to indicate endorsement or other evaluation (e.g., through a browser control or user interface element presented with the associated content). Such relationships to information from others may be captured in a user's social graph.

Affinity between entities of a social graph may be represented by the above-noted edges in the user' social graph. As noted, affinity may identify the closeness of a party to a user. For example, a contact of a contact who has five common middle contacts with the user has more of an affinity with the user (e.g., is considered closer to the user) than a contact of a contact who has only one common middle contact. Factors in determining affinity may include, e.g.: how a contact is connected to the user (e.g., a source of a connection), which social networking site the contact is a member of, whether contact or contact of contact, and how many paths to get to the contact of a contact (e.g., common middle contacts). Edges may be weighted, either in a database containing the social graph or elsewhere, to reflect a level of affinity between connections (e.g., parties) in the social graph.

Affinity between parties may be content specific in some cases. For example, social graph data may identify specific types of content associated with an edge between parties and specific affinities for that content. In an example, the social graph data may specify that, between two connected parties, the first party has a first level of affinity for the second party's videos and a second, different level of affinity for the second party's written work. Similarly, the social graph may specify that the second party has a third, different level of affinity for the first party's blogs. The same is true for content subject matter. For example, the social graph data may specify that, between two connected parties, the first party has a first level of affinity for the second party's content about baseball and a second, different level of affinity for the second party's content about basketball.

Affinity may also be based on the user's interactions with members of the social graph (e.g., the frequency of interaction, the type of interaction, and so forth). For example, a user that frequently clicks on posts by a particular contact may be considered to be closer to that contact than to other contacts where they click on respective posts less frequently. Likewise, if a user frequently "mouses-over" content by an author (e.g., a search result link), but does not select that content, the degree of affinity may be less than if the link were selected. Similarly, an amount of time viewing content may be an indicator that one party likes content from another party. The amount of time viewing particular content may be an indication that one party likes that particular type of content from the other party, as opposed to other types of content from the other party.

In other examples, affinity may be defined by indirect interaction between users. For example, if two users interact with the same content regularly or frequently, those two users may be considered to have an affinity with one other. In still other examples, if two users interact with the same people regularly or frequently, those two users may be considered to have an affinity with one other.

Figure 5:
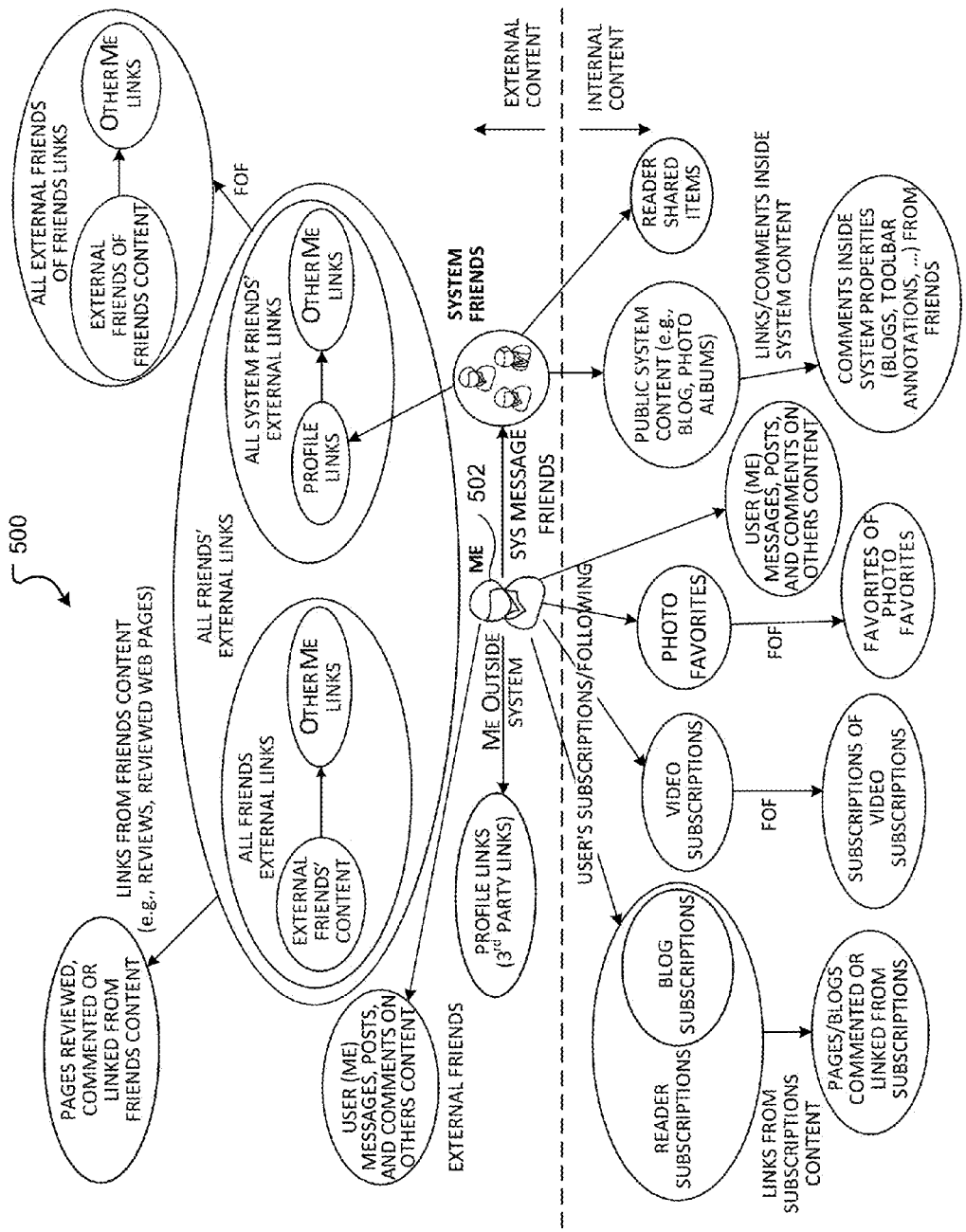
FIG. 5 is a conceptual view of an example of a social graph.

FIG. 5 is a conceptual view of an example social graph 500. Among other things, FIG. 5 shows sources of information for a social graph. In this example, the user's social graph is a collection of connections (e.g., users, resources/content, etc.) identified as having a relationship to the user 502 ("ME") within some degree of separation. The user's social graph may include parties and particular content at different degrees of separation. For example, the social graph of a user may include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

FIG. 5 shows that it is possible to extend the user's social graph to people and content both within a single network and across one or more external networks. For example, the user may have a profile or contacts list that includes a set of identified contacts, a set of interests, a set of links to external resources (e.g., Web pages), and subscriptions to content of a system (e.g., a system that provides various content and applications including electronic messages, chat, video, photo albums, feeds, or blogs). Likewise, blogs that include links to a user's contacts may be part of the user's social graph. These groups may be connected to other users or resources at another degree of separation from the user. For example, contacts of the user may have their own profiles that include connections to resources as well as contacts of the respective contacts, a set of interests, and so forth. In another example, a user may be connected to a social network account. That social network account may reference an article in a newspaper. A social connection, therefore, may be established between the user and the author of the article.

In some implementations, the connections to a user within a specified number of degrees of separation may be considered the bounds of the social graph of a user. Membership and degree of separation in the social graph may be based on other factors, including a frequency of interaction. For example, a frequency of interaction may be by the user (e.g., how often the user visits a particular social networking site) or it may be a type of interaction (e.g., endorsing, selecting, or not selecting items associated with contacts). As interactions change, the relationship of a particular contact in the social graph may also dynamically change. Thus, the social graph may be dynamic rather than static.

Social signals may be layered over the social graph (e.g., using weighted edges or other weights between connections in the social graph). These signals, for example, frequency of interaction or type of interaction between the user and a particular connection, may be used to weight particular connections in the social graph or social graphs without modifying the actual social graph connections. These weights may change as the interaction with the user changes.

Social graphs may be stored using suitable data structures (e.g., list or matrix type data structures). Information describing an aspect of a stored social graph may be considered relationship data. For example, relationship data may include information describing how particular members of a user's social graph are connected to a user (e.g., through what social path is a particular entity connected to the user). Relationship data may also include information describing social signals incorporated in the user's social graph. In some implementations, relationship data may be stored in a relationship lookup table (e.g., a hash table). Suitable keys for locating values (e.g., relationship data) within the lookup table may include information describing the identities of both a user and a member of the user's social graph. For example, a suitable key for locating relationship data within the lookup table may be (User X, User Y), where User Y is a member of User X's social graph.

Social graph information, including that described above, may be indexed for use in information retrieval. The social graph information may be part of a search index in the indexed cache 414 of FIG. 4. Accordingly, the search index may be searched to identify relevant search results that are dependent upon social signals, e.g., that are associated with one or more aspects of a user's social graph, examples of which are provided above. For example, a search system may receive a query and identify, e.g., general search results and user-generated content. The user-generated content may include, e.g., search results based on the indexed social graph information (e.g., content from electronic messages, posts, blogs, chats, etc. of members of the searcher's social graph). The indexed social graph information may be updated intermittently or periodically, for example, to include recently added information associated with the user's social graph. The indexed social graph information may also be updated, e.g., on an on-going basis to reflect relationships determined in accordance with the processes described herein.

A user may prevent addition of members to the user's social graph, e.g., using an opt-out option or by keeping contacts out of particular groups used to generate the social graph. In some implementations, privacy features provide a user with an opt-in or opt-out option to allow or to prevent, respectively, being included (or removed the user if already included) as a member of another's social graph. Thus, users may have control over what personal information or connection information, if existing, is included in their social graphs and, consequently, that is included in the content streams and search results described herein.

Figure 6:
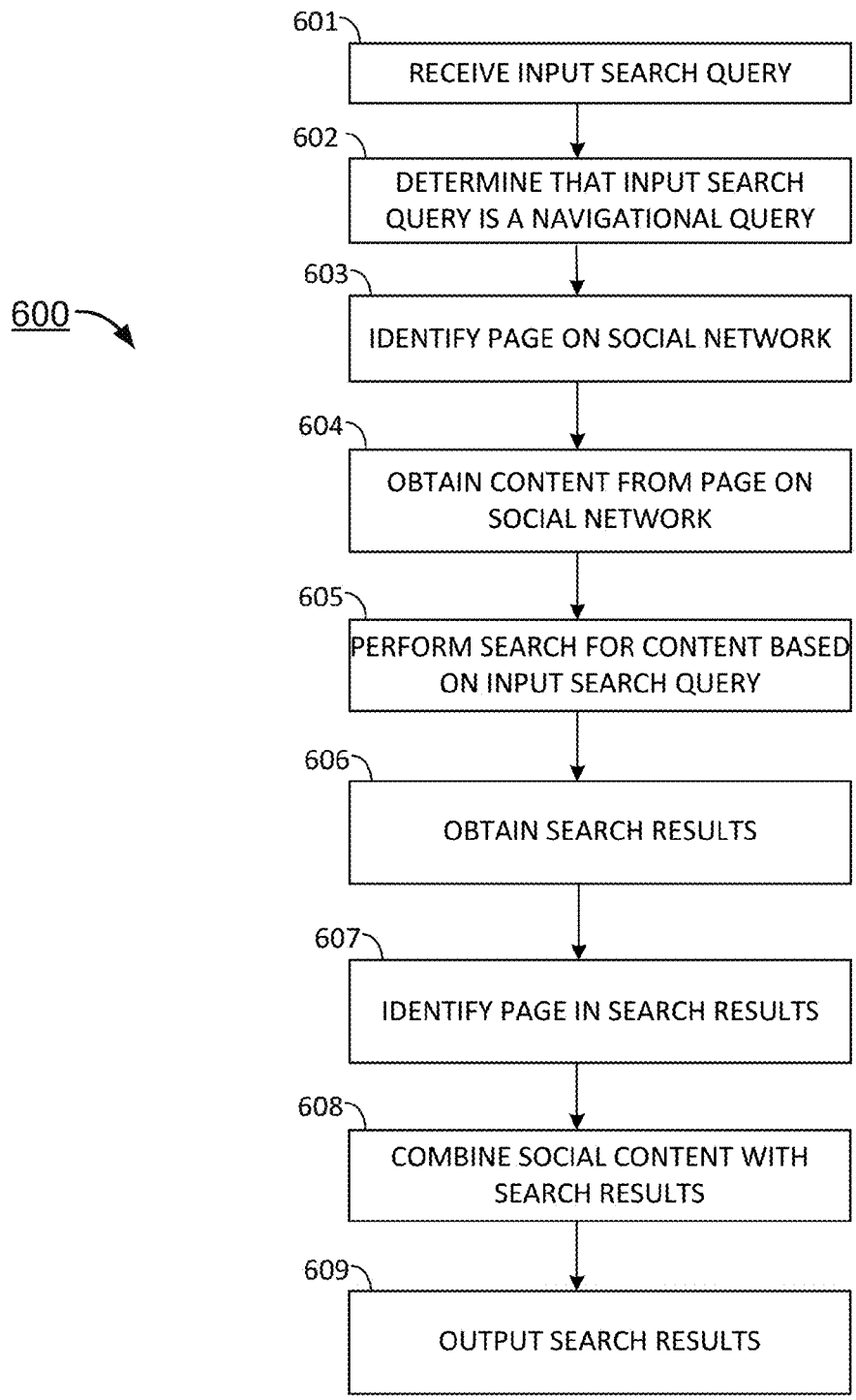
FIG. 6 is a flowchart showing an example of a process for displaying social content in search results.

FIG. 6 is a flowchart of an example of a process 600 for displaying social content in search results. Process 600 may be performed, e.g., by search engine 418, either alone or in combination with content distribution engine 225.

Process 600 receives (601) an input search query for a subject. For example, the input search query may be received through search engine home page 402. In this example, the input search query includes one or more content items (e.g., keyword(s), video(s), image(s), audio, and so forth), which are indicative of a navigational query. As explained above, a navigational query is a search query for locating a Web site for a subject, as opposed to locating general information about the subject. For example, the query content may be some variation of a company name, e.g., "ABCcompany", "ABCcompany.com", "ABC company", and so forth. In some examples, a navigational query will not include additional content items, e.g., additional keywords like "where is" or "what is".

Process 600 determines (602) that the input search query is a navigational query. Various techniques may be used to determine that the input search query is a navigational query. For example, process 600 may identify, over time, queries from different users that are navigational in nature. For example, multiple users may enter "ABCcompany" into search engine 418 over time. In response, search engine 418 (e.g., resource locator engine 416) outputs search results that include the Web page for ABCcompany, namely ABCcompany.com. Search engine 418 may log (e.g., anonymously) how often a user who entered the original search query (e.g., "ABCcompany") selects the corresponding Web page (e.g., ABCcompany.com). Search engine 418 may also maintain a map of queries to search results, e.g., identifying a number of users whose input search queries map to Web pages of a subject of the query (e.g., queries for "ABCcompany" that map to "ABCcompany.com"). The foregoing information may be used to generate a score indicative of a likelihood that that the input search query is a navigational query. For example, a score above or below a certain threshold may cause the input search query to be designated as a known navigational query.

Process 600 may maintain a table, or other construct, that can be used to correlate input search queries to known navigational queries. The table or other construct may be part of a search index in indexed cache 414 or external to the search index or indexed cache 414. The known navigational queries may be associated with a uniform resource locator (URL) or other network address to which each corresponding navigational query is addressed, e.g., "ABCcompany.com". Using the table, or other construct, process 600 determines whether the input search query is a navigational query. This may be done by attempting to correlate the input search query to a corresponding known navigational query. If it is determined that the input search query matches a known a navigational query, process 600 obtains information from a social network page for the subject of the navigational query, and incorporates that information into output search results data.

More specifically, process 600 identifies (603) a page on a social network for the subject of the navigational query, and obtains (604) content from that social network page. In an example implementation, with appropriate permission in place (e.g., an opt-in) from members of the social network, process 600 maintains a table, or other construct, that maps URLs corresponding to known navigational queries to social network userIDs. In the example above, the table, or other construct, may map ABCcompany.com to the social network userID of ABCcompany.com. In an example, the mapping may be between the URL and a userID from a single specified social network. In another example, the mapping may be between the URL and userIDs from multiple social networks of which the subject of the URL is a member and to which the subject posts content. An index of the social network is searched using the social network userID to identify a corresponding social network page for the subject.

Process 600 obtains (604) content from page(s) of social network(s) identified (603) from the URL-to-userID mapping (s). For example, if the subject of the input search query is a member of a single social network, process 600 obtains content (e.g., posts, audio, video, images, and so forth) from the subject's page on the social network (e.g., main page 300 (FIG. 3) at socialnetwork.com/ABCcompany). To do this, process 600 may formulate a search query and resource locator engine 416 may search indexed cache 414 (or elsewhere) for content relevant to the formulated search query. For example, the search query may be formulated to obtain the N (N≥1) most recent posts from the subject's social network page (e.g., posts not older than a certain number of minutes, hours, days, weeks, etc.), the N (N≥1) largest images from the subject's social network page, the N (N≥1) longest video clips from the subject's social network page, and so forth. The query may be formulated to obtain content that is date-sorted or content that is not date-sorted. Thus, in some cases, a company or other entity can indirectly control which content will included in search results by ensuring that the content to be included is dated most recent.

In some implementations, process 600 may consult the searcher's social graph to identify social connections to content on the subject's social network page. For example, process 600 may identify a social connection of the searcher to content on the subject's social network page. The social connection may be of a type described herein, e.g., as shown and described with respect to FIG. 5. For example, process 600 may determine that a post on the subject's social network page was authored by a social network contact of the searcher, that an image on the subject's social network page was endorsed by a social network contact, and so forth. Process 600 may formulate a search query to obtain, from the subject's social network page, content that has an appropriate social connection to the searcher. The extent of the social connection may be used to adjust the relevance score associated with corresponding content and, therefore, which content is obtained. For example, content deemed most relevant, taking into account social connections to the content, may be obtained from the subject's social network page.

In some implementations, the search index may associate popularity scores with content from the subject's social network page. The popularity scores may be used in obtaining content from the subject's social network page. For example, the N (N≥1) posts on a subject's social network page having scores ranked in terms of popularity may be obtained.

Process 600 also performs (605) a search for content relating, generally, to the input search query. For example, resource locator engine 416 may search indexed cache 414 for Web (or other) content that has an appropriate relevance to the search query, and obtain (606) search results corresponding to the identified content. The search results may contain links to Web page URLs associated with the search results, along with snippets and/or other content.

Process 600 identifies (607) a page for the subject of the input search query from among the search results. For example, process 600 may identify the home page of the subject of the query. The home page may be, e.g., the page ranked as most relevant in the search results (identified, e.g., as a link to the first page to be displayed in the search results). In some examples, the home page may be identified from the table, or other construct, that is used to correlate input search queries to known navigational queries. For example, URLs from the retrieved search results may be compared to URLs in the table. In some examples, process 600 may use the fact that a home page is ranked as most relevant in the search results as confirmation that the original search query was navigational. In some implementations, if the subject's home page is not ranked as most relevant to the search query, process 600 may determine that the original query was not navigational. In such a case, process 600 may not incorporate content from the subject's social network page into the search results.

In the following, it is determined that the input search query was navigational. The subject's home page may be represented in the search results by one or more snippets of content from the home page. For example, the snippet(s) may include text excerpts, images, links to video, and so forth. In some examples, additional content may be included. For example, process 600 combines (608) content obtained from the subject's social network page with the content (e.g., snippets) from the general search. For instance, in the search results, content from the subject's social network page may be presented in association with content from the subject's home page (e.g., after, but in the same search results paragraph). The process of combining content may be referred to as "packing" the content. The combined content from the social network page and general search constitute search results for the input search query. Data corresponding to those search results is output (609) to the searcher's computing device for display.

In some implementations, certain content from the subject's social network page may be filtered-out, and not incorporated into the search results. For example, posts that are re-shared or that are not authored by the subject may not be incorporated into the output search results even if their relevance score would otherwise mandate that they be incorporated into the search results.

In some implementations, at least part of a first process that includes determining that the input search query is a navigational query, identifying the first page on the social network for the subject, and obtaining content from the first page is performed in parallel with at least part of a second process that includes obtaining the general search results corresponding to the input search query. In some implementations, the first process may be performed by a front-end system (e.g., one or more computers or computer programs) and the second process may be performed by a back-end system (e.g., one or more computers or computer programs). In other implementations, this is not the case.

Referring back to FIG. 1, search result 102 for an input search query of "ABCcompany" includes content 104 from ABCcompany's home page (e.g., "ABCcompany.com") and content 106 from ABCcompany's social network page (e.g., "socialnetwork.com/ABCcompany"). In some examples (not shown), content from multiple social network pages from different social networks may be displayed. In some examples, the social network from which the content was obtained may be identified. In other cases, this need not be the case.

Although FIG. 1 shows social network content presented below general search results, social network content may be presented at other location(s) relative to the general search results. For example, the social network content may be presented above, alongside of, or elsewhere relative to the general search results.

Figure 7:
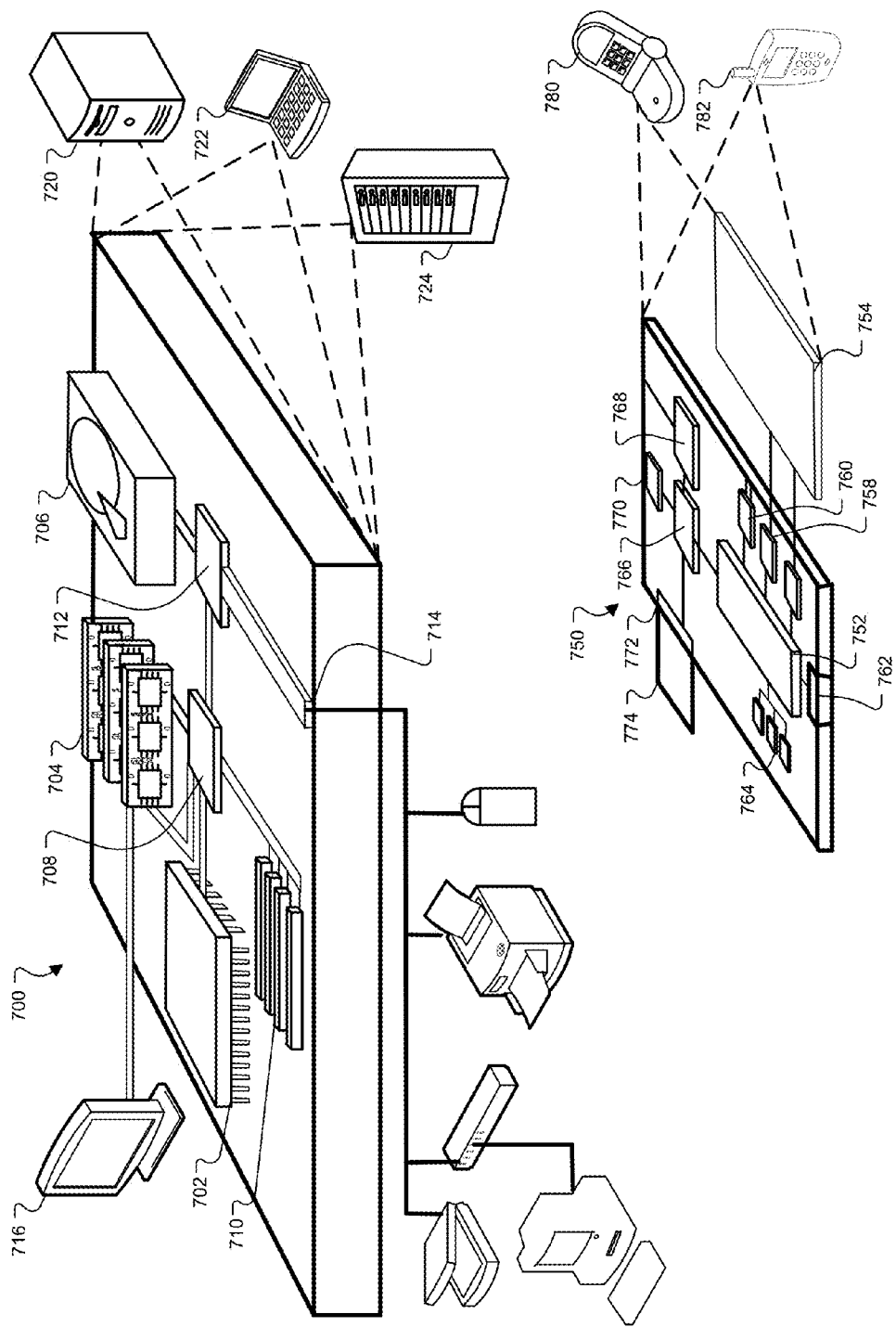
FIG. 7 shows examples of computing devices on which the processes described herein, or portions thereof, may be implemented.

FIG. 7 shows examples of computing devices on which the processes described herein, or portions thereof, may be implemented. In this regard, FIG. 7 shows an example of a generic computing device 700 and a generic mobile computing device 750, which may be used to implement the processes described herein or portions thereof. For example, search system 412 may be implemented on computing device 700. Mobile computing device 750 may represent a client device of FIG. 2. Other client devices of FIG. 2 may also have the architecture of computing device 700.

Computing device 700 is intended to represent various forms of digital computers, examples of which include laptops, desktops, workstations, personal digital assistants, servers, blade servers, mainframes, and other appropriate computers. Computing device 750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, for example, display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, examples of which include a magnetic or optical disk.

The storage device 706 is capable of providing mass storage for the computing device 700. In one implementation, the storage device 706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 704, the storage device 706, or memory on processor 702. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer, e.g., a laptop computer 722. Alternatively, components from computing device 700 may be combined with other components in a mobile device (not shown), e.g., device 750. Each of such devices may contain one or more of computing device 700, 750, and an entire system may be made up of multiple computing devices 700, 750 communicating with each other.

Computing device 750 includes a processor 752, memory 764, an input/output device, e.g. a display 754, a communication interface 766, and a transceiver 768, among other components. The device 750 may also be provided with a storage device, e.g., a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, e.g., control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, e.g., using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, e.g., through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines can be run in a single processing entity or multiple processing entitles. Likewise, individual engines can run in a single processing entity or multiple processing entities. The engines depicted in the figures are not intended to limit the systems described herein to the software architectures shown therein.

For situations in which the systems and techniques discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

All processes described herein and variations thereof (referred to as "the processes") contain functionality to ensure that party privacy is protected. To this end, the processes may be programmed to confirm that a user's membership in a social networking account is publicly known before recommending a connection to that user through the social networking account. Likewise, the processes may be programmed to confirm that information about a party is publicly known before divulging that information to other party, or even before incorporating that information into a social graph.

In the context of this disclosure, the terms social network and social networking service may be used interchangeably.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Other implementations not specifically described herein are also within the scope of the following claims.

What is claimed is:

1. A method performed by one or more processing devices comprising:
    receiving, by the one or more processing devices, an input query;
    determining, by the one or more processing devices, that the input query is a navigational query, the navigational query comprising a query to locate a web site of a subject; and
    in response to determining that the input query is the navigational query:
    obtaining search results corresponding to the input query, the search results comprising first content from a first page specific to the subject, the first page comprising a page of the web site;
    identifying a correlation between an address of the first page to a social network identifier for the subject;
    searching the social network for a second page using the social network identifier;
    obtaining second content provided in the second page of the social network, the second page being a page specific to the subject within the social network;
    combining the first content and the second content to provide combined content; and
    outputting data corresponding to the provided combined content for display of the combined content in search results on a computing device.

2. The method of claim 1, wherein determining that the input query is a navigational query comprises identifying a correlation between the input query and a navigational query among a set of navigational queries.

3. The method of claim 1, wherein first content is provided from the first page based on the input query.

4. The method of claim 3, wherein a predefined number of posts are obtained from the first page based on the input query and are provided in a date-sorted order.

5. The method of claim 3, wherein a relevance score associated with first content is at least partially based on a social connection of the content to a user who provided the input query.

6. The method of claim 1, wherein at least part of a first process that comprises determining that the input query is a navigational query, identifying the first page on the social network for the subject, and obtaining first content from the first page is performed in parallel with at least part of a second process that comprises obtaining the search results corresponding to the input query.

7. The method of claim 1, wherein identifying the second page is based on a ranking of the second page within the search results.

8. The method of claim 1, further comprising filtering the first content to remove at least a portion thereof prior to combining the first content from the first page with the second content.

9. The method of claim 1, wherein first content is obtained from the first page based on a popularity of the first content.

10. The method of claim 1, wherein the second content obtained from the second page comprises one of a snippet of content associated with the second page or a hyperlink that is provided on the second page.

11. One or more non-transitory machine-readable media storing instructions that are executable by one or more processing devices to perform operations comprising:
    receiving an input query;
    determining that the input query is a navigational query, the navigational query comprising a query to locate a web site of a subject; and
    in response to determining that the input query is the navigational query:
    obtaining search results corresponding to the input query, the search results comprising first content from a first page specific to the subject, the first page comprising a page of the web site;
    identifying a correlation between an address of the first page to a social network identifier for the subject;
    searching the social network for a second page using the social network identifier;
    obtaining second content provided in the second page of the social network, the second page being a page specific to the subject within the social network;
    combining the first content and the second content to provide combined content; and,
    outputting data corresponding to the provided combined content for display of the combined content in search results on a computing device.

12. The machine-readable media of claim 11, wherein determining that the input query is a navigational query comprises identifying a correlation between the input query and a navigational query among a set of navigational queries.

13. The machine-readable media of claim 11, wherein first content is provided from the first page based on the input query.

14. The machine-readable media of claim 13, wherein a predefined number of posts are obtained from the first page based on the input query and are provided in a date-sorted order.

15. The machine-readable media of claim 13, wherein a relevance score associated with first content is at least partially based on a social connection of the content to a user who provided the input query.

16. The machine-readable media of claim 11, wherein at least part of a first process that comprises determining that the input query is a navigational query, identifying the first page on the social network for the subject, and obtaining first content from the first page is performed in parallel with at least part of a second process that comprises obtaining the search results corresponding to the input query.

17. The machine-readable media of claim 11, wherein identifying the second page is based on a ranking of the second page within the search results.

18. The machine-readable media of claim 11, wherein operations further comprise filtering the first content to remove at least a portion thereof prior to combining the first content from the first page with the second content.

19. The machine-readable media of claim 11, wherein first content is obtained from the first page based on a popularity of the first content.

20. A system comprising:
   memory storing instructions for implementing a search engine; and
   one or more processing devices to execute the instructions to perform operations comprising:
   receiving an input query;
   determining that the input query is a navigational query, the navigational query comprising a query to locate a web site of a subject; and
   in response to determining that the input query is the navigational query:
   obtaining search results corresponding to the input query, the search results comprising first content from a first page specific to the subject, the first page comprising a page of the web site;
   identifying a correlation between an address of the first page to a social network identifier for the subject;
   searching the social network for a second page using the social network identifier;
   obtaining second content provided in the second page of the social network, the second page being a page specific to the subject within the social network;
   combining the first content and the second content to provide combined content; and,
   outputting data corresponding to the provided combined content for display of the combined content in search results on a computing device.

21. The system of claim 20, wherein determining that the input query is a navigational query comprises identifying a correlation between the input query and a navigational query among a set of navigational queries.

22. The system of claim 20, wherein first content is provided from the first page based on the input query.

23. The system of claim 22, wherein a predefined number of posts are obtained from the first page based on the input query and are provided in a date-sorted order.

24. The system of claim 22, wherein a relevance score associated with first content is at least partially based on a social connection of the content to a user who provided the input query.

25. The system of claim 20, wherein at least part of a first process that comprises determining that the input query is a navigational query, identifying the first page on the social network for the subject, and obtaining first content from the first page is performed in parallel with at least part of a second process that comprises obtaining the search results corresponding to the input query.

26. The system of claim 20, wherein identifying the second page is based on a ranking of the second page within the search results.

27. The system of claim 20, wherein operations further comprise filtering the first content to remove at least a portion thereof prior to combining the first content from the first page with the second content.

28. The system of claim 20, wherein first content is obtained from the first page based on a popularity of the first content.

\* \* \* \* \*